(12) United States Patent
Allen et al.

(10) Patent No.: US 11,540,651 B2
(45) Date of Patent: *Jan. 3, 2023

(54) ROTATABLE PLATFORM RISER SYSTEM

(71) Applicants: Michael Allen, San Luis Obispo, CA (US); Jasper Michalczik, Berlin (DE); Jeremy Fissell, San Luis Obispo, CA (US)

(72) Inventors: Michael Allen, San Luis Obispo, CA (US); Jasper Michalczik, Berlin (DE); Jeremy Fissell, San Luis Obispo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/365,860

(22) Filed: Jul. 1, 2021

(65) Prior Publication Data

US 2021/0321795 A1 Oct. 21, 2021

Related U.S. Application Data

(63) Continuation-in-part of application No. 15/931,458, filed on May 13, 2020, now Pat. No. 11,079,662.

(51) Int. Cl.
*A47F 5/025* (2006.01)
*G03B 17/56* (2021.01)
*G03B 15/06* (2021.01)

(52) U.S. Cl.
CPC ............ *A47F 5/025* (2013.01); *G03B 15/06* (2013.01); *G03B 17/561* (2013.01)

(58) Field of Classification Search
CPC ........ A47F 5/025; G03B 15/06; G03B 17/561

USPC .................................................. 211/163, 166
See application file for complete search history.

(56) References Cited

U.S. PATENT DOCUMENTS 1,479,618 A * 1/1924 Mansbendel ............ A47F 5/025
  108/21
1,982,776 A * 12/1934 Woerner .................. A47F 5/025
  74/425
2,076,784 A * 4/1937 Knipp ..................... A47F 5/025
  108/20

(Continued)

FOREIGN PATENT DOCUMENTS

DE   3725723 A1 *  2/1989  ............ A47F 5/025
DE   4242159 A1 *  6/1994  ............ G09F 19/02

(Continued)

*Primary Examiner* — Stanton L Krycinski
(74) *Attorney, Agent, or Firm* — Barry Choobin; Patent 360

(57) ABSTRACT

The present invention is directed to a rotatable platform riser system used for capturing imagery of objects from one angle or multiple angles with a seamless pure white background without reflections or shadows. The rotatable platform riser system comprises a turntable platform; a rotatory drive mechanism operably coupled to the turntable platform for rotating the turntable platform along its vertical axis; a riser comprising a substantially round open top and a substantially round bottom, an upright wall extending from the bottom to the top defining volume of the riser, the riser mounted or resting on the turntable platform at the bottom; and a riser platform having a top surface and a bottom surface, the riser platform having a diameter same or larger than the diameter of the top of the riser, the riser platform mounted or resting over the top of the riser.

18 Claims, 4 Drawing Sheets

(56) References Cited

U.S. PATENT DOCUMENTS

| | | | | |
|---|---|---|---|---|
| 2,102,982 A * | 12/1937 | Taylor | A47F 5/025 | 211/1.53 |
| 2,132,928 A * | 10/1938 | Blanchard | A47F 5/025 | 464/35 |
| 2,212,499 A * | 8/1940 | Hassan | A47F 5/025 | 221/258 |
| 2,566,674 A * | 9/1951 | Odenthal | A47F 5/025 | 476/67 |
| 3,024,738 A * | 3/1962 | O'Toole | A47F 5/025 | 104/44 |
| 4,892,197 A * | 1/1990 | Slattery | A47F 5/025 | 211/129.1 |
| 5,088,604 A * | 2/1992 | Baur | G11B 23/0236 | 211/1.55 |
| 5,109,989 A * | 5/1992 | Kremmin | A47F 5/025 | 108/20 |
| 5,335,985 A * | 8/1994 | Baur | G11B 15/6825 | 211/163 |
| 5,895,021 A * | 4/1999 | Rosenband | F16M 11/08 | 248/349.1 |
| D613,096 S * | 4/2010 | Stoepker | D6/692.3 | |
| 7,942,276 B2 * | 5/2011 | Johnson | A47F 5/025 | 211/1.53 |
| 8,372,634 B2 * | 2/2013 | Lin | A01N 1/0236 | 435/307.1 |
| 8,499,940 B2 * | 8/2013 | Johnson | A47F 5/025 | 211/1.53 |
| 8,876,362 B2 * | 11/2014 | Nguyen | B01F 29/31 | 366/143 |
| 9,480,348 B2 * | 11/2016 | Hull | A47G 33/126 | |
| 9,538,861 B2 * | 1/2017 | Young | A47F 5/08 | |
| 9,822,920 B2 * | 11/2017 | Lai | G03B 15/07 | |
| 9,883,754 B1 * | 2/2018 | Leonardi | A47F 5/02 | |
| 9,974,385 B2 * | 5/2018 | Villalobos | A47B 49/008 | |
| 2011/0053136 A1 * | 3/2011 | Bereznai | G09B 25/02 | 434/365 |
| 2016/0045040 A1 * | 2/2016 | Young | A47F 5/08 | 312/265.6 |

FOREIGN PATENT DOCUMENTS

| | | | | |
|---|---|---|---|---|
| EP | 0445018 A1 * | 9/1991 | | A47F 5/025 |
| EP | 3162982 A1 * | 5/2017 | | E04H 6/40 |
| FR | 837230 A * | 2/1939 | | A47F 5/025 |
| FR | 1421614 A * | 12/1965 | | A47F 5/025 |
| FR | 2445126 A1 * | 7/1980 | | A47F 5/025 |
| FR | 2481587 A1 * | 11/1981 | | A47F 5/025 |
| FR | 2762198 A3 * | 10/1998 | | A47F 5/025 |
| FR | 2816187 A1 * | 5/2002 | | A47F 5/025 |
| GB | 398282 A * | 9/1933 | | A47F 5/025 |
| GB | 447500 A * | 5/1936 | | A47F 5/025 |
| GB | 762204 A * | 11/1956 | | A47F 5/025 |
| JP | 5270024 B1 * | 8/2013 | | F16D 1/0847 |

\* cited by examiner

ROTATABLE PLATFORM RISER SYSTEM

CROSS-REFERENCE TO RELATED APPLICATIONS

This application is a continuation of a U.S. Non-provisional patent application Ser. No. 15/931,458, filed on May 13, 2020, which claims priority from a U.S. provisional patent application Ser. No. 62/820,788, filed on Mar. 19, 2019, both the applications are incorporated herein by reference in its entirety.

FIELD OF INVENTION

The present invention relates to a rotatable platform riser system used for capturing imagery of objects from one angle or multiple angles with a seamless white background.

BACKGROUND

A 360-degree object photography turntable is a tool used by photographers and videographers to capture imagery of objects rotating in a circular 360-degree motion. This kind of turntable is fundamentally a Lazy-Susan; it typically has a flat, circular-shaped turntable platform which revolves around its vertical axis 360 degrees and can be manually rotated clockwise or counter clockwise. A digital photography camera or video camera is secured on a stationary tripod and aimed towards the object(s) resting on the turntable platform. The turntable may be motorized and computer controlled to achieve a higher degree of angle precision and overall production speed while enabling hands-free capture automation.

An object to be imaged in 360 degrees is typically placed on the turntable platform. The object may also be placed on or secured to a specialized Riser with Riser Platform attached to the turntable's rotating turntable platform. A motorized, computer-controlled turntable will rotate an object until it reaches the next desired angle. It temporary pauses at the desired angle while sending a digital signal to the camera to capture a photo. Pausing the platform for each capture maximizes image sharpness by preventing motion blur. Once the photo is captured, the turntable's platform rotates the object towards the next desired angle to capture the next photo. The rotating platform pauses at evenly spaced angles for each individual capture. This ensures the resulting 360 view's rotation is steady, consistent, and precise. The turntable continues this rotate/pause/capture sequence until all of the desired angles are captured.

Capturing many photos with small platform rotation increments yield a 360 view with a smooth rotation appearance, whereas capturing less photos is faster to produce and reduces load time on a website. A 360 view on a website can contain as few as 6 individual images or as many as 720 individual images, however most 360 views range between 20 and 72 individual still photos captured with a digital photography camera.

It is also possible to produce a 360 view of an object using a video camera. This less common method is done by recording a video of an object rotating continuously on a low-speed motorized turntable. 360 degree imagery derived from video recordings yield moderate motion blur, higher image compression, less overall sharpness and lower image resolution. Low-speed continuous motorized turntables are less expensive than computer controlled turntables, making video capture an attractive low-cost solution.

The majority of object photos and 360 degree object photos have seamless, pure white backgrounds without shadows or reflections. Digital editing is commonly required to remove natural shadows and reflections as well as whiten dark backgrounds and hide photography props and accessories that show up in the background or within the reflections of the object itself. A system that captures object imagery requiring minimal digital editing is desirable. A system that captures object imagery without needing further digital editing is more desirable. A rotating system that captures 360 degree object imagery requiring zero digital editing is the proverbial Holy Grail. Reducing digital editing is exponentially desirable with 360 degree object photos because each object has not one photo, but 20 to 72 individual photos.

Certain embodiments of the present invention are directed to a rotatable platform riser system which may be used as an extension that attaches to a turntable. It is common for the rotatable platform riser system to be constructed partially of transparent materials so that almost all-white backgrounds can be created during photography and/or video capture process. The almost all-white backgrounds are desirable for post editing as the backgrounds are easier to remove. The system may also be used as a non-rotatable riser-alone system for capturing object photography at a single angle, without a turntable. From here, we will discuss a rotatable platform riser system used in combination with a turntable. A rotatable platform riser system is composed of two primary elements: A riser and a riser platform. A riser typically uses four thin, transparent, vertically oriented plastic sheet or rod supports which serve to elevate a riser platform above a turntable. These vertical sheets of plastic or rods are connected to a non-transparent framework and extend upward from the turntable platform. The bottom of a riser framework may rest on top of or attach directly to the rotating turntable platform. A riser platform is a thin circular transparent disc; this serves as a flat horizontal table which an object to be photographed is placed onto. A riser platform rests on top of a riser. The diameter of the riser platform is sized to slightly exceed the footprint of the riser's vertically oriented supports. This type of partially transparent riser in combination with the fully transparent riser platform, can make the background of object imagery become almost all-white and almost visually disappear when a sufficiently bright background is positioned behind it. To achieve this visual disappearance of the top portion of the riser, multiple photography lights are used. Each light separately illuminates an object for photography and a seamless white background set up directly behind the riser and riser platform. This allows for capturing object photography with mostly pure white backgrounds and without the object's shadows or reflections appearing on the riser platform itself. Although the current rotatable platform riser systems are acceptable they have several shortcomings: Vertical edges of the transparent riser supports (sheets/rods) often show up in the white background as they move through the photograph frame area during turntable rotation. These vertical edges can cause uneven white areas in the all-white background and are especially difficult to edit out when they intersect an object's edges. It is common for riser's vertically oriented support edges and non-transparent outward extending metal framework to stick out and show up within the background of photography imagery, thereby substantially increasing digital editing work. Additionally, the riser's vertical support edges and non-transparent framework also shows up within the reflections of reflective objects. It is also common for the riser's vertically oriented supports to bend, wobble, and structurally collapse when moderately heavy objects beyond 10 pounds are placed on the riser platform. Hence, considering the increasing popularity of turntables among object photographers, a need is appreciated for an improved design of the platform riser that does not have the above-identified problems.

For purposes of this invention, the term "photography" refers not only to colored or black and white still photography, but also refers to stop motion photography and videography, to 360 degree object photography, to digital imaging techniques, and to any other known or developed imaging techniques.

SUMMARY OF THE INVENTION

It is, therefore, a principal objective of the present invention to provide a photography platform riser.

An additional objective of the present invention is that the photography platform riser can be directly rested or secured to the top of a turntable's rotating platform.

An additional objective of the present invention is to provide an improved design of the photography platform riser that does not cast any shadow or reflections on objects being photographed.

Another objective of the present invention is that a secondary circular platform disc rests on top of the photography platform riser which gives the object a substrate to be set onto.

A further objective of the present invention is that the photography platform riser provides photography with a solid white background at all angles. This solid white background makes the riser completely disappear and makes the background easy to remove.

Another objective of the present invention is that the photography platform riser reduces background light halos and makes object edges clear and crisp at all angles.

An additional objective of the present invention is that the photography platform riser eliminates foreground and background reflections caused by riser systems of prior art.

An additional objective of the present invention is that the photography platform riser can accommodate larger objects.

An additional objective of the present invention is that the photography platform riser permits the photography camera or video camera to shoot at higher angle relative to the object without the turntable extension itself showing up within the background of the photography.

An additional objective of the present invention is that the riser has no vertical support edges or solid riser framework moving through the background during rotation.

An additional objective of the present invention is that the riser appears the same in all imagery and at all angles due to its circular shape.

An additional objective of the present invention is that the photography platform riser can hold heavier objects than could be possible by previous designs due to its continuous support edge.

An additional objective of the present invention is that the photography platform riser is structurally rigid and has no wobbling.

An additional objective of the present invention is that the photography platform riser is durable.

Yet another objective of the present invention is that the photography platform riser is light in weight, economical to manufacture, easy to store and transport.

Yet another objective of the present invention is that the photography platform riser can be inverted and used as a sturdy turntable stand which aids in reducing unwanted reflections.

BRIEF DESCRIPTION OF THE DRAWINGS

The accompanying figures, which are incorporated herein, form part of the specification and illustrate embodiments of the present invention. Together with the description, the figures further serve to explain the principles of the present invention and to enable a person skilled in the relevant arts to make and use the invention.

DETAILED DESCRIPTION

The present invention relates to a photography turntable used by photographers to capture objects in 360 degrees.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
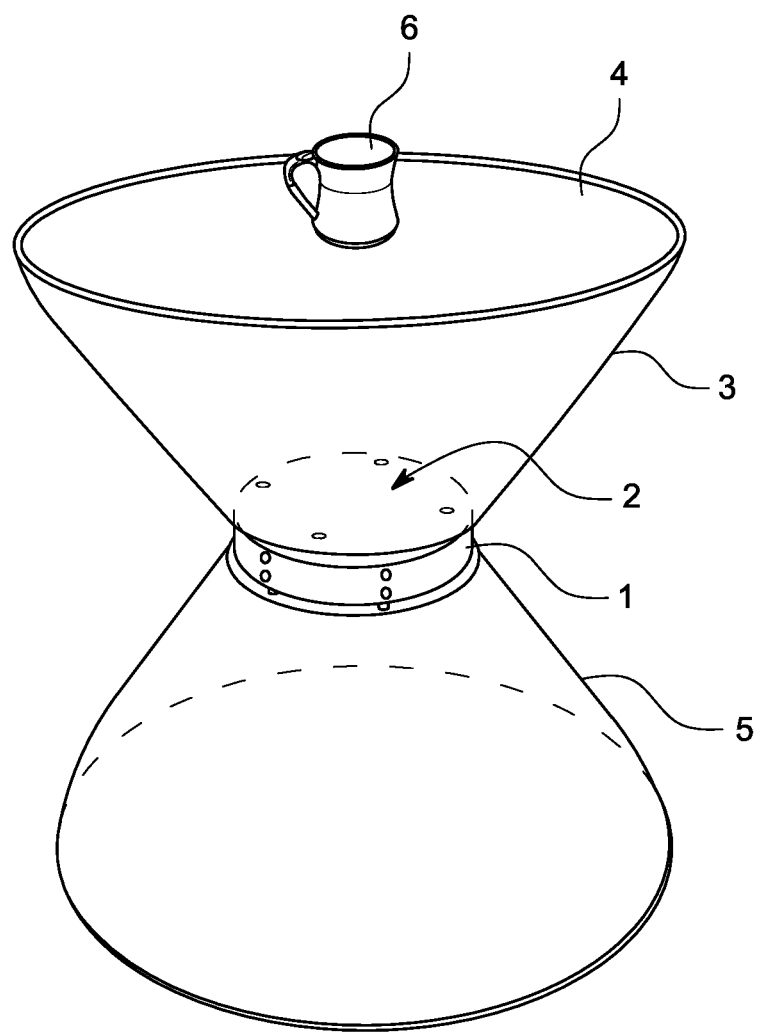
FIG. 1 shows an exemplary embodiment of the present invention which includes a photography platform riser.

Now referring to FIG. 1 which shows an exemplary embodiment of the photography turntable according to the present invention. The photography turntable includes a turntable body 1 and a turntable platform 2 operably mounted on a top side of the turntable body 1. The turntable body 1 encloses a drive mechanism for rotating the turntable platform 2. The drive mechanism could be an electric motor, such as a stepper motor. The motor may be coupled to the turntable platform 2 through a direct gear drive. Also, suitable AC to DC power adaptor may be provided to power the motor. The power adaptor may either be enclosed in the turntable body 1 or provided outside the turntable body 1. A suitable motor controller may also be provided in the wall of the turntable body 1 for allowing a user to control the operation of the motor. For example, an ON/OFF switch and a speed regulator may be provided in the wall of the turntable body 1 to control the operation of the motor by the user. In addition, sensors may also be deployed to precisely monitor and control the operation of the motor. Besides, handheld controllers connected to the motor through a wire may also be used. Such handheld controllers may be easier to operate by the user and the user does not have to reach to the turntable every time for changing the settings. Instead of the wired connection, wireless connectivity can also be used to wirelessly connect the handheld controller to the motor, for example, Bluetooth can be used to connect the handheld controller to the motor.

Further shown in FIG. 1 is a riser 3 mounted on the turntable platform 2. The riser 3 is coupled to the turntable platform 2, such as the riser 3 could be rotated with the rotating turntable platform 2. The riser 3 includes a top, a bottom, and an upright wall extending from the bottom to the top defining volume of the riser 3. The bottom portion of the riser 3 sets on top of or is coupled to the turntable platform 2, while the top is open to form a tank-like structure. In FIG. 1, the riser 3 as shown is substantially conical in shape having a diameter of the bottom lesser than the diameter of the top. The height of the riser 3 may be varied depending upon the requirements of the user. Similarly, the width of the wall of the riser 3 could also be varied depending upon the material of the riser 3 and the desired strength of the riser 3. Also, the diameter of the top of riser 3 can be in different proportion to the diameter of the turntable platform 2. For example, the diameter of the top may be larger than the bottom, the diameter of the top may be smaller than the bottom, or the diameter of the top can be same as the diameter of the bottom. Moreover, the shape of the wall may vary, for example, a straight wall extending from the bottom to the top, or the wall may be curved. Depending upon the diameters of the top and the bottom and the shape of the upright wall, the risers of different shapes could be presented.

The riser 3 could be made of any suitable materials that are known to provide rigidity and strength. The riser 3 should be strong enough to hold a riser platform 4 and an object. Preferably, the riser 3 could be made from a material which is transparent, translucent, or white in color. In case of transparent or translucent material, the white light may be used to illuminate the riser 3 as white. Large varieties of materials are commercially known, for example, glass, plastics etc. It is preferable to have lightweight materials, such as plastics making the riser lighter in weight. A more preferred example of the material that could be used in making the riser 3 are polycarbonate plastics. Polycarbonate plastics are light in weight, clear and strong. It is obvious that other suitable materials could also be used without any limitation.

Over the riser 3 is mounted the riser platform 4 as shown in FIG. 1. The riser platform 4 is a round shaped sheet having a predetermined width. The riser platform 4 is mounted over the edges of the riser 3, thus the diameter of the riser platform 4 may be either same or larger than diameter of the top of the riser 3. The riser platform 4 can be made of same or different material than that of the riser 3. Preferably, the riser platform 4 is made of a transparent or translucent material. On the riser platform 4 is placed an object for photographing. For example, FIG. 1 shows an example of the object, which is a cup 6 placed on the top surface of the riser platform 4. The turntable can be rotated to get the desired face of the cup 6 within the viewfinder of a camera.

Proper photography lighting may be used to illuminate the riser platform 4 to get the desired color environment for photography. For example, white color photography lights may be deployed to illuminate the riser platform 4 in white color. In operation, a white backdrop is placed directly behind the riser platform 4 such that a flash from the camera illuminates the backdrop. The illuminated white backdrop is so bright and white during the flash that it makes the riser platform 4 and the riser 3 completely disappear in the corresponding photographs. Any reflections on the surface of the riser platform 4 also disappear due to the bright white illumination. The riser platform 4 and the riser 3 are invisible in the photograph as all the reflections and edges disappear as the bright white illuminates the turntable.

Also shown in FIG. 1 is a floor-stand 5 coupled to the turntable body 1. The floor-stand 5 is used to support the turntable on the floor at the desired height. The floor-stand 5 can be made of any suitable material that is rigid and strong. Preferably plastics can be used because of their lightweight. The floor-stand 5 could be removably attached to the turntable body 1, for example, using screws, snap fit and like.

Figure 2:
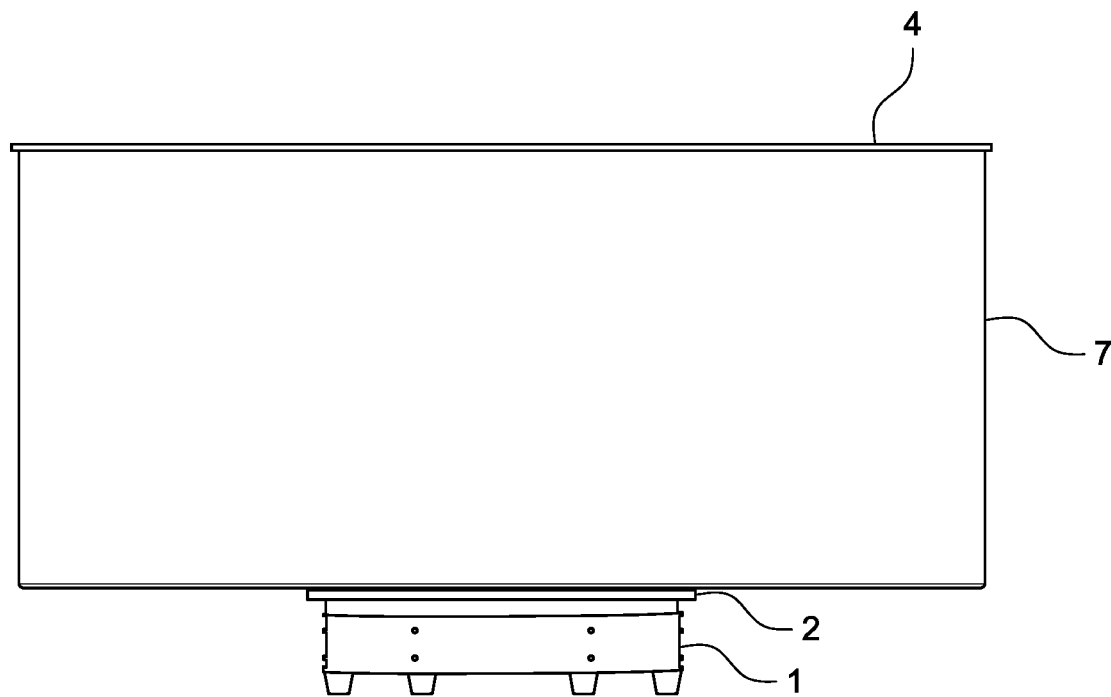
FIG. 2 shows another embodiment of the photography turntable, wherein the riser is conical shaped.

FIG. 2 shows an alternate embodiment of the riser 3, which is a cylindrical shaped riser 7. The riser 7 is mounted on the turntable platform 2 and the turntable platform 2 is mounted on a turntable body 1. The cylindrical shaped riser 7 has the top and the bottom of the same diameter. An upright wall extends perpendicularly from the bottom to the top. The top of the riser 7 is open and the riser platform 4 is mounted over the edge of the riser 7.

Figure 3:
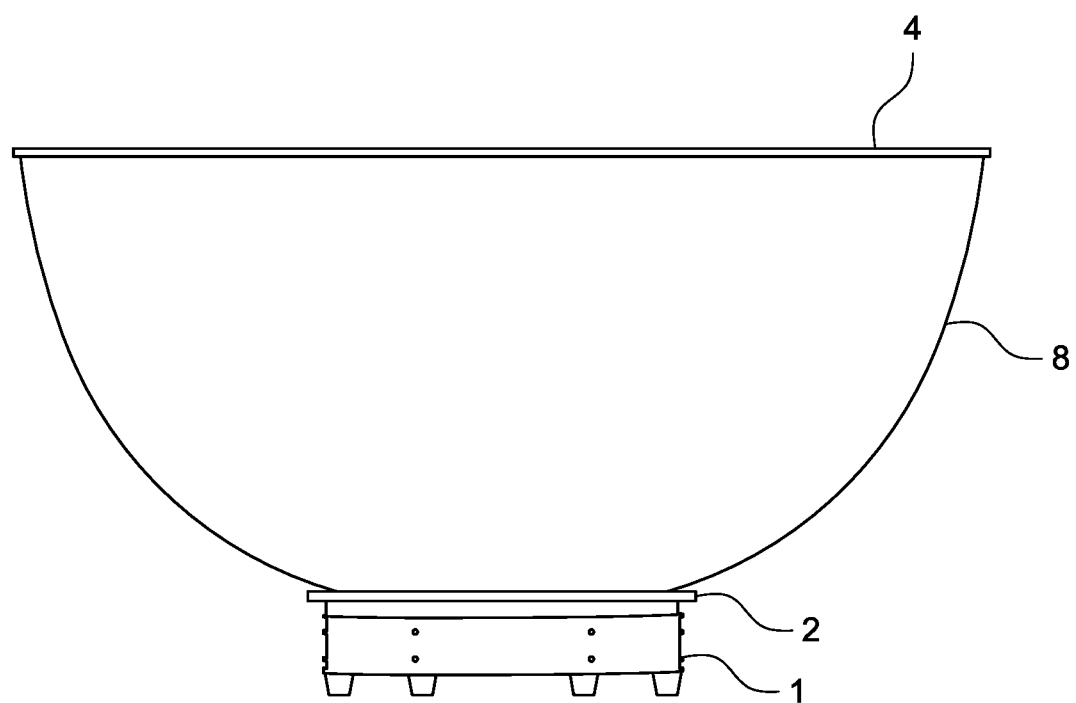
FIG. 3 shows another embodiment of the photography turntable, wherein the riser is dome shaped.

Similarly, FIG. 3 shows a dome-shaped riser 8. The diameter of the top of the riser 8 is larger than that the diameter of the bottom and a curved upright wall extending from the bottom to the top. The riser 8 is mounted on the turntable platform 2, which is mounted on the turntable body 1. The riser platform 4 is mounted over the top edge of the riser 8.

Figure 4:
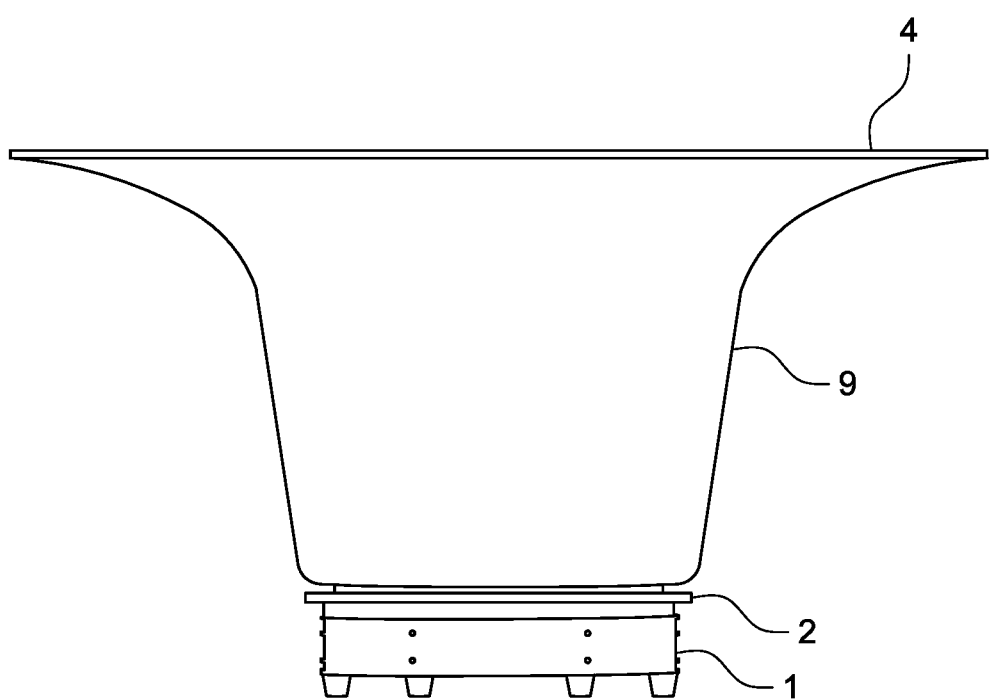
FIG. 4 shows another embodiment of the photography turntable, wherein the riser is bell shaped.

FIG. 4 shows a bell-shaped riser 9 in which the diameter of the top is more than the diameter of the bottom and an upright wall extending from the bottom to the top in slightly curved shape up to half of the length of the wall, and thereafter curves sharply outwards to form a bell-like structure. The riser platform 4 is supported on the top edge of the riser 9. The riser 9 is mounted on the turntable platform 2 and the turntable platform is mounted on the turntable body 1.

Figure 5:
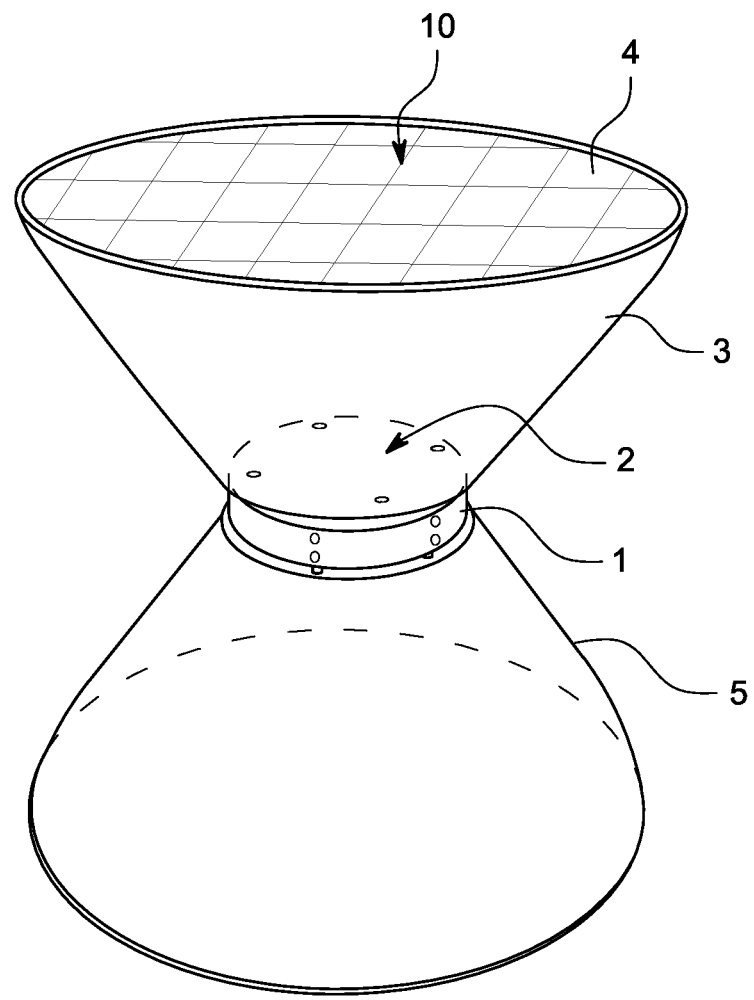
FIG. 5 shows the photography turntable platform of FIG. 1 further comprising markings.

FIG. 5 shows the turntable platform 2 mounted on the turntable body 1, a conical-shaped riser 3 mounted on the turntable platform 2 and a floor-stand 5 coupled to the turntable body 1. The riser platform 4 is mounted over the top edge of the riser 3. FIG. 5 further shows markings 10 over the top surface of the riser platform 4. The markings 10 are of the shape of small squares. The markings 10 may be used to align objects, to be photographed, over the riser platform 4. Although FIG. 5 shows the markings 10 on the top surface of the riser platform 4, the markings 10 can also be disposed on the bottom surface of the riser platform 4. FIG. 5 shows the markings in shape of squares, it is obvious that the markings 10 could be of any other shape, for example, concentric circles. These markings are invisible in the photographs, as they become invisible in the illumination caused by flash of the camera.

The present invention is advantageous over the designs of prior arts by providing a durable and break resistant turntable. The photography turntable according to the present invention makes background solid white at all angles which is extremely desirable in post editing. It eliminates background light halos, which makes the object edges clear and crisp at all angles. Furthermore, it eliminates foreground and background reflections due to absence of vertical rods, vertical flat plastic supports, and crossbeam supports etc., as in previous designs of the turntable. It can accommodate larger objects due to increased support from the riser. The camera can shoot at higher angle because aluminum support beams are eliminated. It can hold ten times weight than previous designs due to single continuous support edge. The design of the turntable is structurally rigid, thus eliminating any wobble. Lesser parts make the invention economical to manufacture. The design of the turntable according to the present invention is structurally rigid, it can double as a floor stand (when turned upside-down) for the turntable to sit on.

The above advantages and features are of representative embodiments only and are not exhaustive and/or exclusive. They are presented only to assist in understanding the invention. It should be understood that they are not representative of all the possible embodiments of the invention and are not to be considered limitations on the invention, which will be defined by the claims of any resulting patent and are not to be considered limitations on equivalents to the claims. For instance, some of these advantages may be mutually contradictory, in that they cannot be simultaneously present in a single embodiment. Similarly, some advantages are applicable to one aspect of the invention and inapplicable to others. Furthermore, certain aspects of the claimed invention have not been discussed herein. However, no inference should be drawn regarding those discussed herein relative to those not discussed herein other than for purposes of space and reducing repetition. Additionally, terms are to be understood with reference to the subject matter.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A platform riser system comprising:
   a turntable body enclosing a stepper motor and a controller configured to control operation of the stepper motor;
   a turntable platform rotatably mounted on a top of the turntable body and operably coupled to the stepper motor;
   a riser, the riser has a top, a bottom, and an upright wall extending from the bottom to the top defining a volume of the riser;
   a riser platform that has a top surface and a bottom surface, the riser platform has a diameter equal to or greater than a diameter of the top of the riser, the riser platform mounted on the top of the riser; and
   a frustum-shaped floor stand, wherein the turntable body is mounted on the floor stand, a diameter of a bottom of the floor stand is larger than a diameter of the turntable body.

2. The platform riser system of claim 1, wherein the riser is mounted to or resting on the turntable platform.

3. The platform riser system of claim 1, wherein the riser is made of a transparent material.

4. The platform riser system of claim 1, wherein the riser is made of a non-transparent material.

5. The platform riser system of claim 1, wherein the riser platform is made of a transparent material.

6. The platform riser system of claim 1, wherein the riser platform is made of a non-transparent material.

7. The platform riser system of claim 1, wherein the riser is made of plastic.

8. The platform riser system of claim 1, wherein the riser is made of glass.

9. The platform riser system of claim 1, wherein the riser platform is made of plastic.

10. The platform riser system of claim 1, wherein the riser platform is made of glass.

11. The platform riser system of claim 1, wherein the riser is dome shaped.

12. The platform riser system of claim 1, wherein the riser is cylindrical-shaped.

13. The platform riser system of claim 1, wherein the riser is bell-shaped.

14. The platform riser system of claim 1, wherein the riser is conical-shaped.

15. The platform riser system of claim 1, wherein the top surface of the riser platform comprises markings, the markings are shaped to align or position an object on the riser platform.

16. The platform riser system of claim 5, wherein the bottom surface of the riser platform comprises markings, the markings are shaped to align or position an object on the riser platform.

17. A platform riser system comprising:
   a turntable body enclosing a stepper motor and a controller configured to control operation of the stepper motor;
   a turntable platform rotatably mounted on a top of the turntable body and operably coupled to the stepper motor;
   a riser, the riser has a top, a bottom, and an upright wall extending from the bottom to the top defining a volume of the riser; and
   a riser platform that has a top surface and a bottom surface, the riser platform has a diameter equal to or greater than a diameter of the top of the riser, the riser platform mounted on the top of the riser, the riser platform is transparent, and a continuous grid of polygonal units or concentric circles configured over the bottom surface of the riser platform for aligning or positioning an object on the top surface of the riser platform relative to the continuous grid.

18. A platform riser system comprising:
   a turntable body enclosing a stepper motor and a controller configured to control operation of the stepper motor;

a turntable platform rotatably mounted on a top of the turntable body and operably coupled to the stepper motor;

a riser, the riser has a top, a bottom, and an upright wall extending from the bottom to the top defining a volume of the riser; and a riser platform that has a top surface and a bottom surface, the riser platform has a diameter equal to or greater than a diameter of the top of the riser, the riser platform mounted on the top of the riser, the top surface of the riser platform is having a continuous grid of polygonal units or concentric circles for aligning an object on the top surface of the riser platform relative to the continuous grid, the continuous grid configured to be concealed under a flash of a camera.

* * * * *